US012688743B2

(12) United States Patent
Thorsen et al.

(10) Patent No.: US 12,688,743 B2
(45) Date of Patent: Jul. 21, 2026

(54) MULTI-FACTOR AUTHENTICATION FOR PREMISES MONITORING SYSTEMS

(71) Applicant: The ADT Security Corporation, Boca Raton, FL (US)

(72) Inventors: Wayne Thorsen, Boca Raton, FL (US); Mark Reimer, Denver, CO (US); Shy Ward, Flower Mound, TX (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 18/736,812

(22) Filed: Jun. 7, 2024

(65) Prior Publication Data

US 2025/0037522 A1     Jan. 30, 2025

Related U.S. Application Data

(60) Provisional application No. 63/616,164, filed on Dec. 29, 2023, provisional application No. 63/516,367, filed on Jul. 28, 2023.

(51) Int. Cl.
| | |
|---|---|
| *G08B 25/00* | (2006.01) |
| *G06V 40/16* | (2022.01) |
(Continued)

(52) U.S. Cl.
CPC ....... *G07C 9/00563* (2013.01); *G06V 40/172* (2022.01); *G08B 25/008* (2013.01); *G10L 15/26* (2013.01); *G10L 17/24* (2013.01)

(58) Field of Classification Search
CPC .............. G07C 9/00563; G06V 40/172; G08B 25/008; G10L 15/26; G10L 17/24; G10L 17/00
See application file for complete search history.

(56) References Cited

U.S. PATENT DOCUMENTS

| | | | |
|---|---|---|---|
| 9,100,453 | B2 | 8/2015 | Chen et al. |
| 9,626,841 | B2 | 4/2017 | Fadell et al. |
(Continued)

OTHER PUBLICATIONS

International Search Report and Written Opinion dated Oct. 17, 2024 for International Application No. PCT/US2024/038521 filed on Jul. 18, 2024, consisting of 17 pages.
(Continued)

*Primary Examiner* — Vernal U Brown
(74) *Attorney, Agent, or Firm* — Weisberg I.P. Law, P.A.

(57) ABSTRACT

A system is provided. The system includes at least one computing device. The at least one computing device receives a recognized person message indicating a recognized person associated with a premises is proximate an access location of the premises, where the recognized person message corresponds to a first authentication indication for authenticating the recognized person. The at least one computing device further, in response to receiving the recognized person message, transmits a command to capture an audible passcode from the recognized person. The at least one computing device further receives a passcode message based on the audible passcode, authenticates the recognized person based on the recognized person message and the passcode message, and in response to authenticating the recognized person causes the premises monitoring system to disarm and causes an electronic door lock associated with the premises to unlock.

20 Claims, 8 Drawing Sheets

(51) Int. Cl.
  *G07C 9/00*      (2020.01)
  *G10L 15/26*     (2006.01)
  *G10L 17/24*     (2013.01)

(56)          References Cited

U.S. PATENT DOCUMENTS

| | | | |
|---|---|---|---|
| 10,490,003 | B2 | 11/2019 | Eyring et al. |
| 10,565,856 | B2 | 2/2020 | Sol |
| 10,567,312 | B2 | 2/2020 | Goldberg et al. |
| 10,586,114 | B2 | 3/2020 | Potter et al. |
| 10,629,015 | B1 | 4/2020 | Burge et al. |
| 10,635,907 | B2 | 4/2020 | Child et al. |
| 10,750,128 | B2 | 8/2020 | Fu et al. |
| 10,832,509 | B1 | 11/2020 | Read et al. |
| 10,861,265 | B1 | 12/2020 | Merkley et al. |
| 10,999,561 | B2 | 5/2021 | Child et al. |
| 11,361,060 | B1 | 6/2022 | Lyman et al. |
| 11,455,854 | B2 | 9/2022 | Hager et al. |
| 11,477,139 | B2 | 10/2022 | Rosenberg et al. |
| 11,735,018 | B2 | 8/2023 | Khadloya et al. |
| 2015/0109112 | A1 | 4/2015 | Fadell et al. |
| 2015/0248798 | A1 | 9/2015 | Howe et al. |
| 2015/0332273 | A1* | 11/2015 | Bruno ............. G06Q 20/40145 705/44 |
| 2016/0014103 | A1 | 1/2016 | Masters et al. |
| 2016/0055698 | A1 | 2/2016 | Gudmundsson et al. |
| 2016/0078699 | A1 | 3/2016 | Kalb et al. |
| 2017/0064261 | A1 | 3/2017 | Peng et al. |
| 2017/0373876 | A1 | 12/2017 | Scalisi |
| 2018/0005143 | A1 | 1/2018 | Camargo et al. |
| 2018/0025726 | A1 | 1/2018 | Gatti de Bayser et al. |
| 2018/0350170 | A1 | 12/2018 | Wang et al. |
| 2019/0327448 | A1 | 10/2019 | Fu et al. |
| 2020/0089850 | A1* | 3/2020 | Wan ....................... G06F 21/32 |
| 2020/0267354 | A1 | 8/2020 | Siminoff |
| 2020/0349786 | A1* | 11/2020 | Ho ....................... G06V 40/172 |
| 2021/0134100 | A1* | 5/2021 | LaRovere .......... G07C 9/00571 |
| 2021/0232983 | A1 | 7/2021 | Camargo et al. |
| 2021/0398368 | A1 | 12/2021 | Edwards et al. |
| 2022/0237972 | A1 | 7/2022 | Read et al. |
| 2022/0247738 | A1 | 8/2022 | Gahir et al. |
| 2022/0397686 | A1 | 12/2022 | Scacchi et al. |
| 2023/0083819 | A1 | 3/2023 | Hager et al. |

OTHER PUBLICATIONS

International Search Report and Written Opinion dated Oct. 14, 2024 for International Application No. PCT/US2024/038353 filed on Jul. 17, 2024, consisting of 12 pages.

International Search Report and Written Opinion dated Apr. 11, 2025 for International Application No. PCT/US2024061443 filed Dec. 20, 2024, consisting of 15 pages.

U.S. Office Action dated Aug. 11, 2025 for U.S. Appl. No. 18/736,822, consisting of 10 pages.

\* cited by examiner

MULTI-FACTOR AUTHENTICATION FOR PREMISES MONITORING SYSTEMS

CROSS-REFERENCE TO RELATED PATENT APPLICATION

This application is related to and claims priority to U.S. Provisional Patent Application Ser. No. 63/516,367, filed on Jul. 28, 2023, entitled METHODS AND SYSTEMS FOR CONTEXT BASED PREMISES ACCESS, and to U.S. Provisional Patent Application Ser. No. 63/616,164, filed on Dec. 29, 2023, entitled MULTI-FACTOR AUTHENTICATION FOR PREMISES MONITORING SYSTEMS, the entireties of which are incorporated herein by reference.

TECHNICAL FIELD

The present technology is generally related to multi-factor authentication in a premises monitoring system.

BACKGROUND

Home burglar alarm systems and other types of premises monitoring systems can be used to monitor a premises for detectable events that may trigger an alarm or some other action when the premises monitoring system is in an armed state. Some premises monitoring systems can also control access to a premises by, for example, locking and unlocking entrances to the premises.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

The present disclosure relates to multi-factor authentication in a premises monitoring system.

Figure 1:
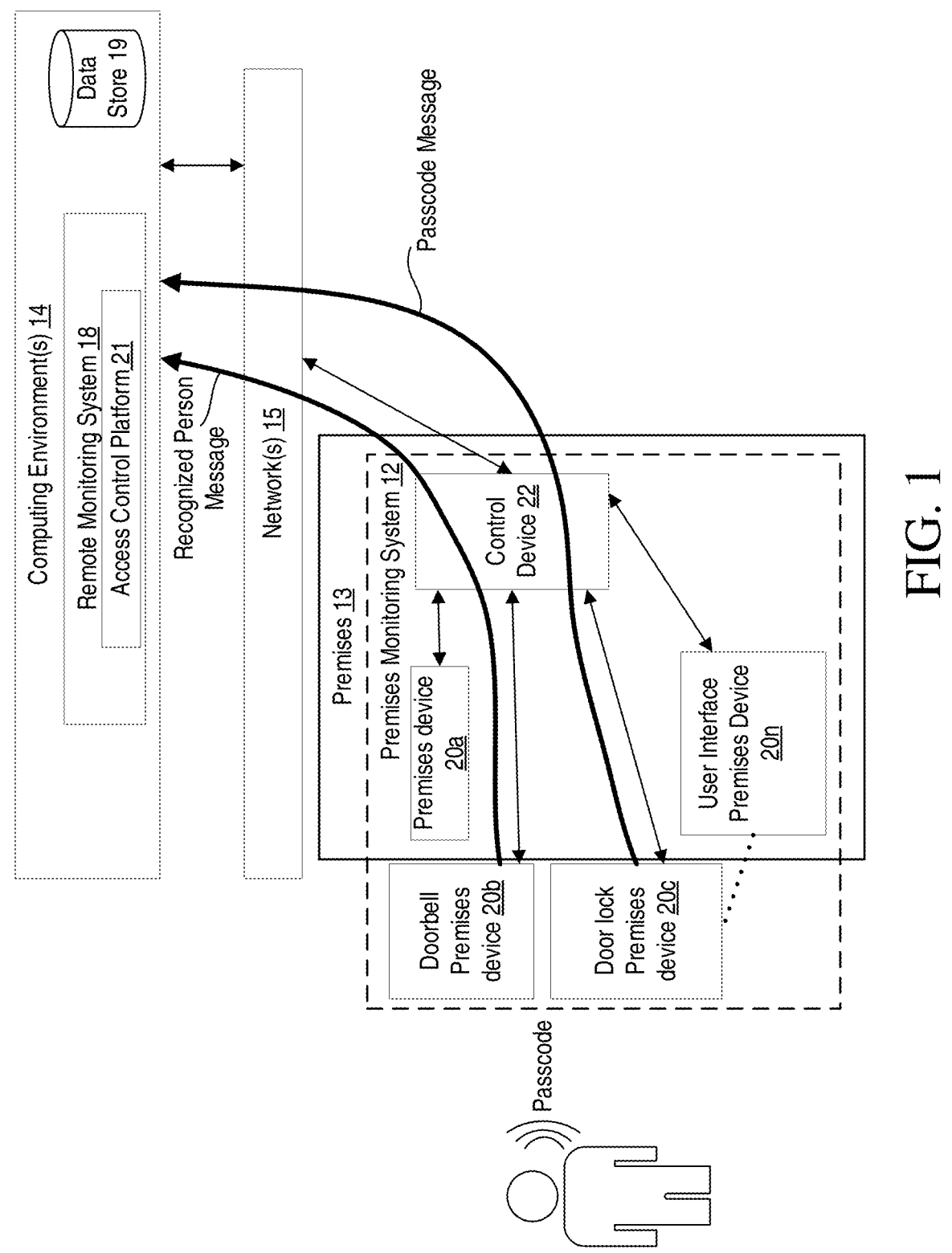
FIG. 1 is a block diagram of an example system according to some embodiment of the present disclosure.

Referring to the drawing figures, in which like elements are referred to by like reference numerals, there is shown in FIG. 1 a diagram of an example system 10 according to some embodiments of the present disclosure. System 10 may include premises monitoring system 12 for monitoring premises 13, and one or more computing environments 14 that may be in communication with each other via one or more networks 15 (collectively referred to as network 15). In embodiments described herein, the joining term, "in communication with" and the like, may be used to indicate electrical or data communication, which may be accomplished by physical contact, induction, electromagnetic radiation, radio signaling, infrared signaling or optical signaling, for example. Multiple components may interoperate and modifications and variations are possible to achieve the electrical and data communication. In some embodiments described herein, the term "coupled," "connected," and the like, may be used herein to indicate a connection, although not necessarily directly, and may include wired and/or wireless connections.

Premises monitoring system 12 may be configured to provide functionality relating to premises monitoring. For example, premises monitoring system 12 may be used to detect burglaries, smoke, fires, carbon monoxide leaks, water leaks, etc. and report detected events to remote monitoring system 18 of computing environment 14. Additionally, the premises monitoring functionality performed by premises monitoring system 12 may include home automation functionality. Examples of home automation functionality include thermostat control, door lock control, lighting control, appliance control, entertainment system control, etc.

Premises monitoring system 12 may include one or more premises devices 20a-20n (collectively referred to as "premises device 20") for providing one or more of monitoring functionality, home automation functionality, etc. Premises device 20 may be in communication with control device 22 via one or more networks such as, for example, a local area network at premises 13 and/or short range wireless protocol network (e.g., BLUETOOTH LOW ENERGY (BLE), ultrawideband (UWB), Digital Enhanced Cordless Telecommunications (DECT) Ultra Low Energy (ULE), ZIGBEE, Z-WAVE, among other Institute of Electrical and Electronics Engineers (IEEE) based short range wireless protocols, etc.). For example, in one or more embodiments, user interface premises device 20n may communicate wirelessly with computing environment 14 via Wi-Fi, or may communicate wirelessly with control device 22 via Z-WAVE, ZIBGEE, etc., for example, in one or more embodiments, door lock premises device 20c may communicate wirelessly with control device 22 or user interface premises device 20n via Z-WAVE, ZIGBEE, etc.

Premise device 20 may include one or more sensors, devices configured to capture audio, images, and/or video, and/or other devices. For example, premises devices 20 may include motion sensors, fire sensors, smoke sensors, heat sensors, carbon monoxide sensors, flood sensors, flow sensors, temperature sensors, humidity sensors, proximity sensors, contact sensors, glass break sensors, water consumption sensors, water pressure sensors, etc. Devices configured to capture audio, images, and/or video may include still image cameras, video cameras, microphones, etc. Additional examples of premises devices 20 include sirens, garage door controllers, smart doorbells (e.g., video doorbell camera configured to capture audio, images and/or video), temperature sensors, humidity sensors, lighting devices, switches, electrical outlets, electronic door locks, electronic door locks with a microphone and a visual indicator, premises locks, and electrical plugs.

For example, in various embodiments, premises device 20 may include doorbell premises device 20*b* that may be a video doorbell camera that may be configured to identify or recognize a specific person in a video generated by the video doorbell camera. Video doorbell camera may be configured to transmit a recognized person message to computing environment 14, as described herein. In another example, in various embodiments, premises device 20 may include door lock premises device 20*c* that may be an electronic door lock that comprises a microphone and a visual indicator. The electronic door lock may be configured to capture an audible passcode and transmit a passcode message (e.g., an authentication indication) to computing environment 14, as described herein.

Premises device 20 may include one or more user interface premises devices 20*n* that are in communication with control device 22. The user interface premises device 20*n* may include a user interface, such as one or more buttons, a touch screen, a display, a microphone, a speaker, and/or other types of user interface components. According to various embodiments, the user interface premises device 20*n* may be, for example, a keypad device, such as a wall-mountable keypad device configured to be installed near an entrance of the premises 13, that a user may operate to arm and disarm the premises monitoring system 12.

System 10 further comprises control device 22 that may be configured to control various aspects of premises monitoring system 12 and/or communicate with remote monitoring system 18. According to various embodiments, the control device 22 may be, or include, a wall-mountable panel device (e.g., a wall-mounted alarm system panel), a tabletop panel device (e.g., a tabletop alarm system panel), an alarm control panel having an enclosure and hinged door configured to be mounted in a closet, etc. Further, the control device 22 may have a short-range wireless communication radio that facilitates communication with one or more premises devices 20 and/or other devices via one or more short-range wireless communication protocols. Control device 22 may be configured to control premises devices 20, such as locks (e.g., electronic door locks), doors, windows, actuators, valves, motors, and any other controllable devices associated with premises monitoring system 12. According to various embodiments, control device 22 may be a gateway device, an alarm system panel, a hub and/or another type of device configured to control aspects of premises monitoring system 12.

Further, computing environment 14 may include remote monitoring system 18, data store 19, and access control platform 21. Remote monitoring system 18 may be configured to provide remote monitoring services for multiple premises monitoring systems 12. For example, in the event that an open door, open window, glass break, etc. is detected by a premises device 20 when premises monitoring system 12 is in an armed state, premises monitoring system 12 may transmit an alarm signal to remote monitoring system 18. In response, a remote monitoring system 18 and/or a human monitoring agent associated with remote monitoring system 18 may notify first responders, such as police, fire, emergency medical responders, etc., and/or one or more designated people associated with the premise monitoring system 12. According the various embodiments, the notification can be a telephone call, an electronic message, etc. to a public-safety answering point (PSAP) that handles communications for first responders.

Access control platform 21 may be further configured to allow temporary access (e.g., time-based access, alarm-based access, event-based access, guest access, etc.) to premises 13 to one or more people based at least on an access policy stored in data store 19. In particular, access control platform 21 may be configured to provide one or more types of access to premises 13 via premises monitoring system 12. For example, certain types of users may be provided access to premises 13 for different types of access control. Different types of users may include, for example, designated family members of at least one person associated with premises 13, designated neighbors near premises 13; designated vendors and assistants, such as dog walkers, housekeepers, pet sitters, contractors, etc., designated guests, etc.

Further, the different types of access control may include time-based access, alarm-based access, event-based access or guest access. Time-based access may provide a person (e.g., person recognized by user interface premises device 20*n*) with a specified time to access one or more portions of premises 13, such as when a homeowner, resident or other person associated with premises 13 is temporarily away from premises 13 and may want someone to enter premises 13 for a limited amount of time. Alarm-based access may correspond to access that is triggered by an alarm event, such as an alarm event detected by premises monitoring system 12, which may include, for example, leak detection alarms, smoke alarms, carbon monoxide alarms, instructions alarms, etc. and/or other event that may indicate a danger to life or property. Hence, controlled access to the premises may be provided to one or more designated users in response to one or more alarms to facilitate access to the premises 13 and potentially prevent or reduce harm to property and life. Event-based access may correspond to providing one or more designated users access to premises 13 based on an event detected by computing environment 14 and/or components of premises monitoring system 12. For example, in response to premises monitoring system 12 and/or remote monitoring system 18 detecting a person having fallen in the premises 13 based on video analytics, access control platform 21 may grant access to premises 13, after authentication described herein, to help the individual who fell. Guest access may include providing one or more guests access to premises 13 for a specific purpose. For example, the guest may be a dog walker who requires temporary access to premises 13 to get and walk the dog.

In particular, access control platform 21 may be configured to perform functionality related to granting access, if any, to an authenticated person. For example, access control platform 21 may be configured to authenticate a person, and in response, retrieve access data or an access profile for the authenticated person. The access data or access profile may be stored in data store 19 and may indicate the one or more types of access control that are applicable to the user and one or more rules (e.g., criterion, criteria, access policies) that specify when to grant access. That is, one or more pre-configured rules may be stored in data store 19 and specify the type(s) of authentication acceptable for a particular user and how many authentication factors are required for the access control platform 21 to grant the person access to premises 13. The one or more rules may be based on one or more of: day(s) of the week, time(s) of day, type of triggered alarm, type of detected event, type of vendor, the purpose of the person accessing the premises 13, etc. Access control platform 21 may function as a rules engine and may ensure premises monitoring system 12 is disarmed prior to unlocking a door to prevent false alarms.

In one or more embodiments, one or more types of access can be combined with additional rules or conditions, such as rules or conditions based on one or more of time of day, day of the month, premises monitoring system 12 modes (e.g., armed away, vacation mode, etc.) or a number of occurrences. The number of occurrences can be used to allow entry to premises 13 only a prescribed number of times, such as one time where subsequent access attempts will fail.

Data store 19 may be configured to store various information and/or data associated with authenticating a person as described herein and with the type of access to be provided to an authenticated person. For example, data store 19 may store at least one authentication criterion (e.g., rule) that specifies one or more conditions required for a person to be deemed authenticated for the purpose of granting the person access to premises 13. In some embodiments, the authentication criteria define one or more rules that must be satisfied for a person to be deemed authenticated for the purpose of granting access to premises 13. One example of a rule requires authentication to occur, within a time window, based on two or more forms of authentication data (e.g., recognized person message, passcode message, etc.). The time window may be initiated, for example, upon the access control platform 21 receiving the recognized person message (e.g., an indication of a recognized person). For example, in response to receiving the recognized person message (e.g., first authentication data), remote monitoring system 18 or access control platform 21 may trigger a countdown timer, and the passcode message may be required to be received before expiration of the timer in order to meet a rule.

In one or more embodiments, data store 19 and/or doorbell premises device 20b may store identification information for a plurality of people (e.g., family members, guests, vendors, providers, etc.) who may be provided a type of access described herein. Identification information may include facial recognition data (e.g., face library), biometric data, among other data associated with one or more characteristics of a person. Further, data store 19 may store a timestamped log associated with each time a recognized person gains access to the premises 13. This log can be reviewed by the homeowner and used to modify one or more access rules for the recognized person or other people.

Figure 2:
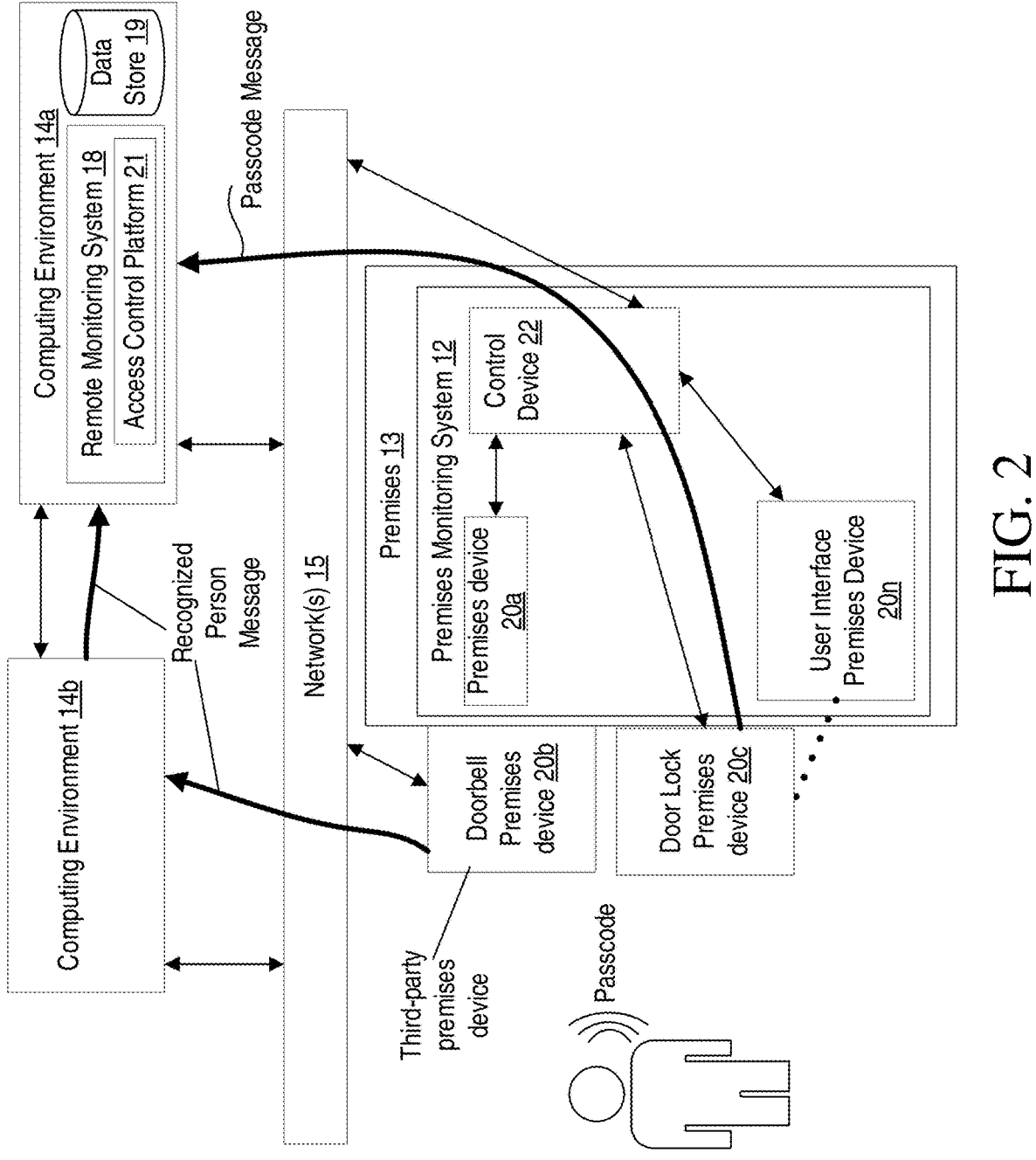
FIG. 2 is a block diagram of another example system according to some embodiment of the present disclosure.

FIG. 2 is a diagram of another example of a system 10. In the example of FIG. 1, system 10 includes computing environment 14 (now referred to as computing environment 14a) as described with respect to FIG. 1. As shown in FIG. 2, system 10 further includes computing environment 14b operated by a third-party relative to the operator of the remote monitoring system 18 and/or access control platform 21. Computing environment 14b may include one or more computing systems that provide computing resources for computing environment 14a, and/or others. For example, computing environment 14b may provide remote data storage, cloud computing resources, and/or other resources for computing environment 14a and/or others. As discussed herein, the doorbell premises device 20b may be configured to transmit various data to computing environment 14b. Computing environment 14b may be configured to perform one or more functions using data captured by and/or received from doorbell premises device 20b, described herein.

Doorbell premises device 20b may be configured to capture media data such as audio, images, and/or video. To this end, doorbell premises device 20b may be, for example, a smart doorbell with one or more cameras and microphones, a smart lock with one or more image cameras and microphones, or a security camera with one or more image sensors and microphones. According to some embodiments, doorbell premises device 20b may be configured to detect a person in captured media data using facial recognition analytic(s) applied to at least a portion of the media data. For example, doorbell premises device 20b may be configured to perform facial recognition on media data to determine whether the analyzed media data matches a known facial profile of a user, i.e., to detect a recognized face of a person in the video generated by doorbell premises device 20b. The known facial profile may correspond to a facial profile of a family member, vendor, guest or helper. In some embodiments, if the analyzed media data matches a known facial profile, the doorbell premises device 20b transmits a message (e.g., recognized person message, authentication data, etc.) to computing environment 14b via network 15 where the message transmitted by doorbell premises device 20b indicates a recognized person was detected, in media data, by doorbell premises device 20b. The message transmitted by doorbell premises device 20b may include image data, video data and/or an indication of a result of facial recognition performed on the image data and/or the video data.

Computing environment 14b may be configured to transmit the recognized person message to computing environment 14a where the recognized person message corresponds to an authentication indication usable by the computing environment 14b as part of the determination of whether to authenticate the recognized person with the premises monitoring system 12.

In some embodiments, computing environment 14b may be configured to perform analytics operations on the data received from premises device 20. For example, computing environment 14b may be configured to perform facial recognition on media data received from doorbell premises device 20b to determine whether the analyzed media data matches a known facial profile. In some embodiments, if the analyzed media data matches a known facial profile, computing environment 14b may transmit a message to computing environment 14a indicating that a known person was detected in the media data.

Computing environment 14a may determine whether an authentication criteria is met based on, for example, (1) the message from the computing environment 14b indicating that a known person has been detected in media data from the doorbell premises device 20b and (2) the received passcode message, as described herein.

Figure 3:
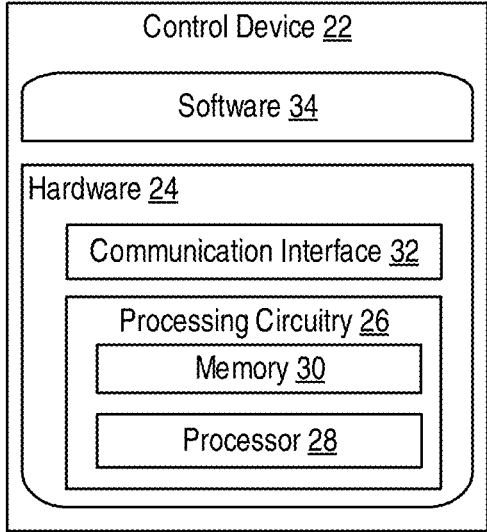
FIG. 3 is a block diagram of an example control device of the system of FIG. 1 and/or FIG. 2 according to various embodiments of the present disclosure.

FIG. 3 shows a block diagram illustrating an example control device 22 of premises monitoring system 12. As shown, control device 22 comprises hardware 24. The hardware 24 may include processing circuitry 26. The processing circuitry 26 may include one or more processors 28 and one or more memories 30. Each processor 28 may include and/or be associated with one or more central processing units, data buses, buffers, and interfaces to facilitate operation. In addition to or instead of a processor 28 and memory 30, the processing circuitry 26 may comprise other types of integrated circuitry that perform various functionality. Integrated circuitry may include one or more processors 28, processor cores, field programmable gate arrays (FPGAs), application specific integrated circuits (ASICs), graphics processing units (GPUs), systems on chips (SoCs), or other components configured to execute instructions. The processor 28 may be configured to access (e.g., write to and/or read from) the memory 30, which may comprise any kind of volatile and/or nonvolatile memory, e.g., cache, buffer memory, random access memory (RAM), read-only memory (ROM), optical memory, and/or erasable programmable read-only memory (EPROM). Further, memory 30 may be embodied in the form of one or more storage devices. The processing circuitry 26 may be configured to perform various functionality described herein. For example, computer instructions may be stored in memory 30 and/or another computer-readable medium that, when executed by processor 28, causes the processor 28 to perform various functionality described herein.

Hardware 24 may include communication interface 32 facilitating communication between control device 22 and one or more elements in system 10. For example, communication interface 32 may be configured for establishing and maintaining at least a wireless or wired connection with one or more elements of system 10 such as premises device 20 and/or computing environment 14.

Control device 22 further has software 34 (which may include one or more software applications) stored internally in, for example, memory 30, or stored in external memory (e.g., database, storage array, network storage devices, etc.) accessible by the control device 22 via an external connection. Software 34 may include any software or program that configures processing circuitry 26 to perform the steps or processes of the present disclosure.

The processing circuitry 26 may be configured to control any of the methods and/or processes described herein and/or to cause such methods, and/or processes to be performed, e.g., by control device 22. One or more processors 28 may cause control device 22 to perform the functionality described herein. The memory 30 is configured to store data, including but not limited to files and/or other data. In some embodiments, the software 34 may include instructions that, when executed by the processor 28 and/or processing circuitry 26, causes the processor 28 and/or processing circuitry 26 to perform the processes described herein with respect to control device 22. Accordingly, by having computer instructions stored in memory 30 accessible to the processor 28, the processor 28 may be configured to perform the actions described herein.

Figure 4:
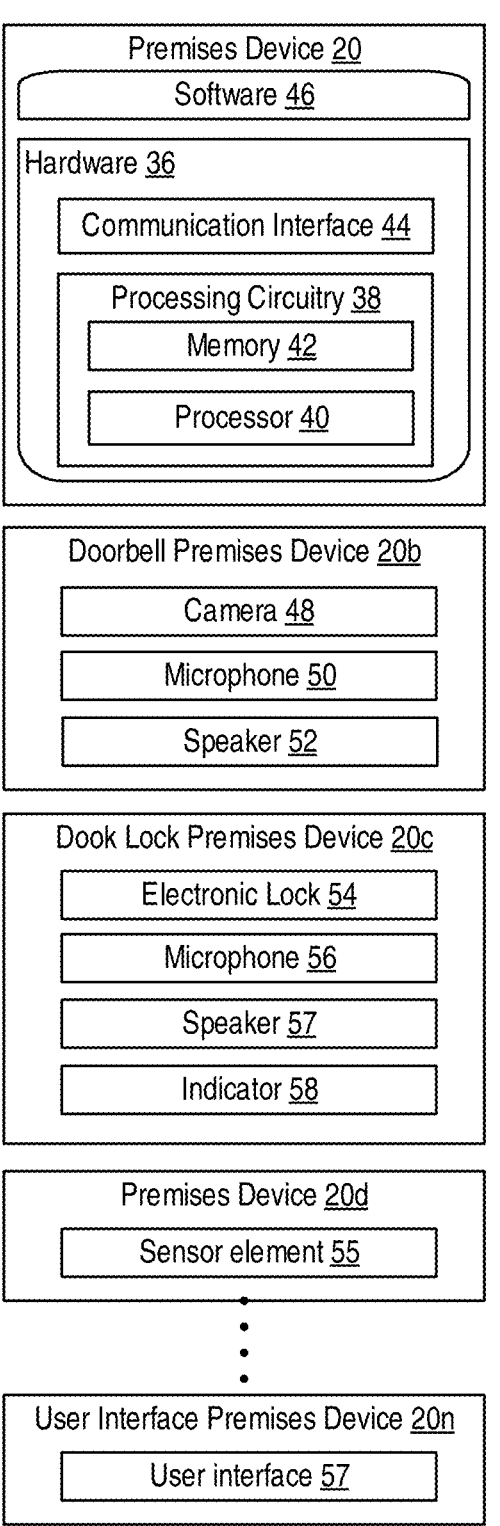
FIG. 4 is a block diagram of example premises devices of the system of FIG. 1 and/or FIG. 2 according to various embodiments of the present disclosure.

FIG. 4 is a block diagram illustrating several example premises devices 20a-n (referred to collectively herein as premises devices 20) according to some embodiments of the present disclosure. As shown, premises device 20a comprises hardware 36. The hardware 36 may include processing circuitry 38. The processing circuitry 38 may include one or more processors 40 (e.g., one or more premises device processors) and one or more memories 42. Each processor 40 may include and/or be associated with one or more central processing units, data buses, buffers, and interfaces to facilitate operation. In addition to or instead of a processor 40 and memory 42, the processing circuitry 38 may comprise other types of integrated circuitry that performs various functionality. Integrated circuitry may include one or more processors 104, processor cores, FPGAs, ASICs, GPUs, SoCs, or other components configured to execute instructions. The processor 40 may be configured to access (e.g., write to and/or read from) the memory 42, which may comprise any kind of volatile and/or nonvolatile memory, e.g., cache, buffer memory, RAM, ROM, optical memory, and/or EPROM. Further, memory 42 may be embodied in the form of one or more storage devices. The processing circuitry may be configured to perform various functionality described herein. For example, computer instructions may be stored in memory 42 and/or another computer-readable medium that, when executed by processor 40, causes the processor 40 to perform various functionality associated with premises device 20a.

Hardware 36 may include communication interface 44 facilitating communication between premises device 20a and one or more elements in system 10. For example, communication interface 44 may be configured for establishing and maintaining at least a wireless or wired connection with one or more elements of system 10 such as control device 22 and/or computing environment 14.

Premises device 20a further has software 46 (which may include one or more software applications) stored internally in, for example, memory 42, or stored in external memory (e.g., database, storage array, network storage devices, etc.) accessible by the premises device 20a via an external connection. Software 46 may include any software or program that configures processing circuitry 38 to perform the steps or processes of the present disclosure.

The processing circuitry 38 may be configured to control any of the methods and/or processes described herein and/or to cause such methods, and/or processes to be performed, e.g., by premises device 20a. Processor 40 corresponds to one or more processors 40 for performing premises device 20a functions described herein. The memory 42 is configured to store data and/or files and/or other information/data. In some embodiments, the software 46 may include instructions that, when executed by the processor 40 and/or processing circuitry 38, causes the processor 40 and/or processing circuitry 38 to perform the processes described herein with respect to premises device 20a. Accordingly, by having computer instructions stored in memory 42 accessible to the processor 40, the processor 40 may be configured to perform the actions described herein.

With reference to doorbell premises device 20b in FIG. 4, in one or more embodiments, doorbell premises device 20b includes the same or similar hardware as premises device 20a described above, except that doorbell premises device 20b further includes one or more of camera 48, microphone 50 or speaker 52. Camera 48 is configured to capture media such as, for example, at least one of video or still images. Microphone 50 is configured to capture media such as, for example, audio proximate microphone 50. Speaker 52 may be configured to emit one or more audible sounds. In one or more embodiments, doorbell premises device 20b may be a networked doorbell having a camera 48 and a microphone 50.

With reference to door lock premises device 20c in FIG. 4, in one or more embodiments, door lock premises device 20c includes the same or similar hardware as premises device 20a described above, except that door lock premises device 20c further includes electronic lock 54, microphone 56, speaker 57 and indicator 58. For example, electronic lock 54 may comprise an electrically actuatable door locking mechanism where door lock premises device 20c may receive a command to lock or unlock the door locking mechanism and actuate the door locking mechanism according to the command. In one or more embodiments, door lock premises device 20c is positioned at and/or proximate an access point or location of premises 13.

Further, microphone 56 may be configured to capture audio proximate door lock premises device 20c. For example, microphone 56 is configured to capture an audible passcode spoken by a person that is proximate door lock premises device 20c and/or audible feedback to the person. Speaker 57 may be configured to emit one or more audible sounds. In one or more embodiments, door lock premises device 20c may include one or more speech-to-text analytic functions for converting the captured audible passcode to a text passcode. Indicator 58 is configured to prompt the person to provide an audible passcode. For example, in some embodiments, indicator 58 is a visual indicator configured to emit a visual indication to prompt the recognized person to provide the audible passcode, as described herein. Visual indicator may include one or more light emitting diodes (LEDs) for emitting one or more wavelengths from door lock premises device 20c and/or illuminating the numbered button LEDs on a door lock keypad of door lock premises device 20c. Further, in one or more embodiments, the numbered button LEDs on the door lock keypad may be illuminated to create a pattern or animation. Alternatively, the visual indicator may comprise another type of light emitting device or component, according to the teachings described herein. In one or more embodiments, speaker 57 may be configured to audibly prompt the person to provide the audible passcode. In one or more embodiments, one or more of electronic lock 54, microphone 56, speaker 57 and indicator 58 may be commanded to perform the respective function(s) described herein. For example, one or more commands from computing environment 14 may cause electronic lock 54 to lock or unlock, cause microphone 56 to turn on or turn off, cause indicator 58 to emit a visual indication or cease emitting the visual indication, or cause speaker 57 to emit an audible indication or cease emitting the audible indication. In one or more embodiments, indicator 58 may include one or more of a visual indicator, audible indicator, or other type of indicator that is able to prompt a person for an audible passcode and/or prompt the person to re-state the audible passcode Further, in one or more embodiments, door lock premises device 20c is configured to perform speaker recognition or voice biometrics using the captured audio. Speaker recognition or voice biometrics may correspond to a process for identifying a person who was speaking in captured audio. In one example, door lock premises device 20c is configured to, via processing circuitry 38, identify a person who spoke the captured audible passcode (or spoke other captured audible sounds) by performing speaker recognition or voice biometrics on the captured audible passcode (or other captured audible sounds). In this example, it may be assumed that the identified person had been previously registered with premises monitoring system 12. The identification of the person through speaker recognition or voice biometrics may be one factor of authentication in the multi-factor authentication process described herein.

Figure 5:
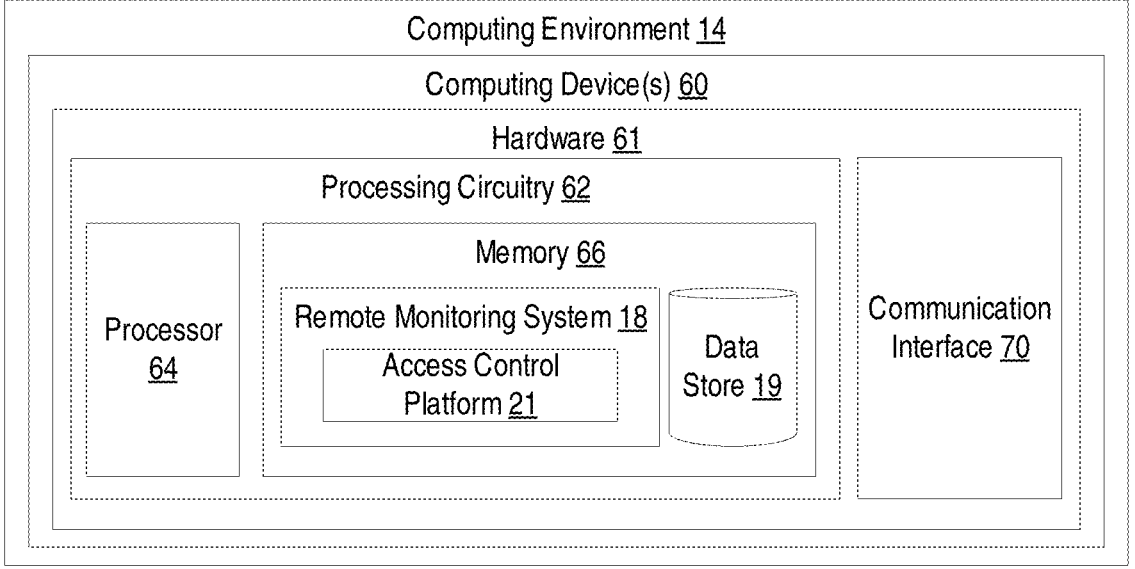
FIG. 5 is a block diagram of an example computing environment of FIG. 1 and/or FIG. 2 according to various embodiments of the present disclosure.

In one or more embodiments, premises device 20d includes the same or similar hardware as premises device 20a described above, except that premises device 20d further includes one or more sensor elements 55 configured to perform sensing as described herein. In one or more embodiments, user interface premises device 20n is a user interface device that includes the same or similar hardware as premises device 20a described above, except that user interface premises device 20n further includes user interface 57 such as a control panel touchscreen or buttons to allow a user to interface with user interface premises device 20n. In other words, each premises device 20 may comprise hardware and software that is similar to the hardware and software described with respect to premises device 20a, but with other elements to provide the desired functionality, e.g., sensing, locking, user interface, etc., FIG. 5 is a block diagram illustrating the example computing environment 14 according to various embodiments. As shown, the computing environment 14 may include one or more computing devices 60. In embodiments using multiple computing devices 60, the computing devices 60 may be located in a single installation or may be distributed among many different geographic locations. As shown, each computing device 60 comprises hardware 61. The hardware 61 may include processing circuitry 62. The processing circuitry 62 may include one or more processors 64 and one or more memories 66. Each processor 64 may include and/or be associated with one or more central processing units, data buses, buffers, and interfaces to facilitate operation. In addition to or instead of a processor 64 and memory 66, the processing circuitry 62 may comprise other types of integrated circuitry that perform various functionality. Integrated circuitry may include one or more processors 64, processor cores, FPGAs, ASICS, GPUs, SoCs, or other components configured to execute instructions. The processor 64 may be configured to access (e.g., write to and/or read from) the memory 66, which may comprise any kind of volatile and/or nonvolatile memory, e.g., cache, buffer memory, RAM, ROM, optical memory, and/or EPROM. Further, memory 66 may be embodied in the form of one or more storage devices. The processing circuitry 62 may be configured to perform various functionality described herein. For example, computer instructions may be stored in memory 66 and/or another computer-readable medium that, when executed by processor 64, causes the processor 64 to perform various functionality.

Hardware 61 may include communication interface 70 facilitating communication between one or more elements in system 10. For example, communication interface 70 may be configured for establishing and maintaining at least a wireless or wired connection with one or more elements of system 10 such as control devices 22, premises devices 20, etc.

The processing circuitry 62 may be configured to control any of the methods and/or processes described herein and/or to cause such methods, and/or processes to be performed, e.g., in computing environment 14. Processor 64 corresponds to one or more processors 64 for performing computing device 60 functions described herein.

The memory 66 is configured to store data, such as files, remote monitoring system data, and/or other information/data. Also stored in the memory 66 and executable by the processor 64 is the remote monitoring system 18. Although FIG. 5 shows the remote monitoring system 18 being in a single computing device 60, the remote monitoring system 18 may execute in multiple computing devices 60 of the computing environment 14. To perform the functionality of the remote monitoring system 18 and/or access control platform 21, the memory 66 may include instructions that, when executed by the processor 64 and/or processing circuitry 62, causes the computing device 60 to perform the functionality performed by the remote monitoring system 18 and/or access control platform 21 described herein.

Figure 6:
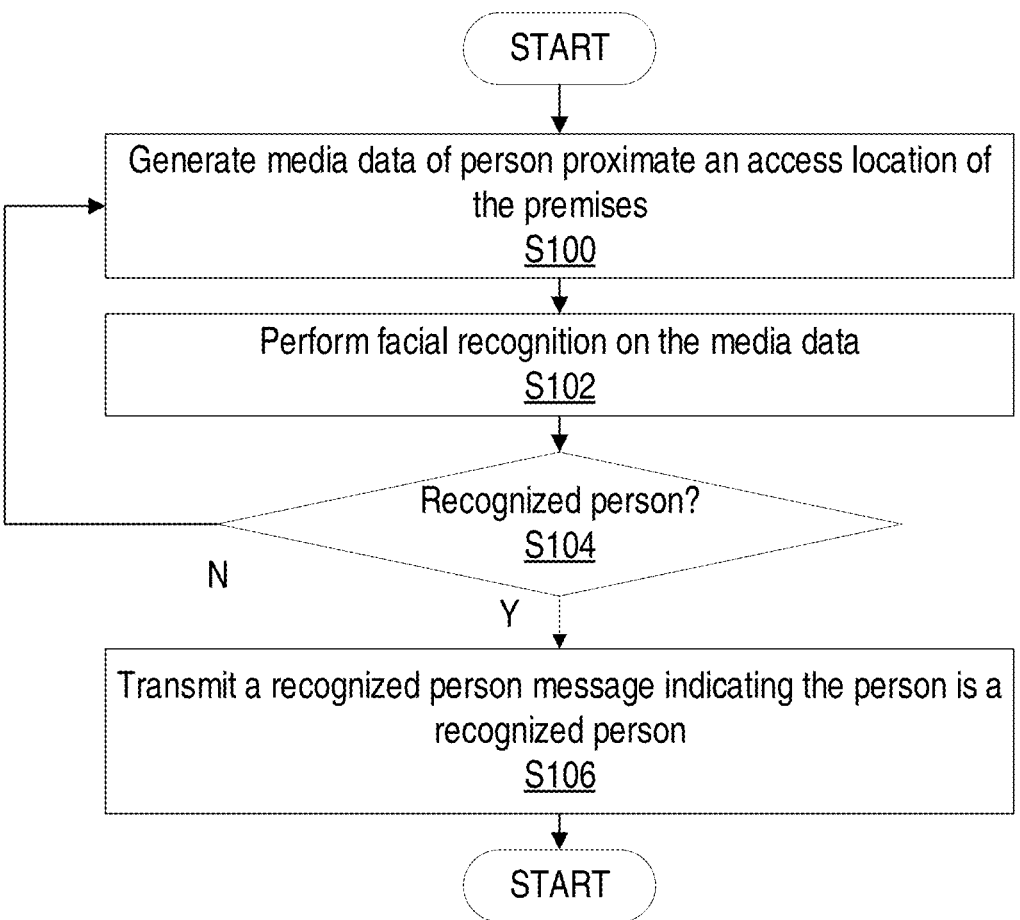
FIG. 6 is a flowchart of example functionality performed by a premises device of FIG. 1 and/or FIG. 2 according to various embodiments of the present disclosure.

FIG. 6 is a flowchart of an example process implemented by doorbell premises device 20b according to some embodiments of the present disclosure. In this example, the doorbell premises device 20b is embodied in the form of a networked doorbell (e.g., a smart doorbell) that includes a camera 48, microphone 50, and speaker 52. Furthermore, in the following discussion, the doorbell premises device 20b has been installed and positioned so that the field of view of the camera of the doorbell premises device 20b captures an area proximate to an entrance of the premises 13. As an example, the doorbell premises device 20b may be installed so that the field of view of its camera captures at least a portion of a walkway, porch, etc. in front of the front door of a home.

Beginning at block S100, the process comprises the doorbell premises device 20b generating media data of a person proximate an access location of the premises 13 (Block S100). For example, doorbell premises device 20b may capture images and/or video of a person that is approaching and/or proximate doorbell premises device 20b and/or an access point of the premises 13. The doorbell premises device 20b then performs facial recognition on the media data (Block S102). For example, the doorbell premises device 20b may be configured to perform facial recognition on the video and/or images captured by doorbell premises device 20b.

At block S104, the doorbell premises device 20b determines whether the person is a recognized person based on facial recognition (Block S104). For example, recognizing the person may comprise using facial recognition to attempt to determine whether the face of the person matches a predefined profile that may include one or more stored facial recognition characteristics. If the person is not recognized by doorbell premises device 20b, the process may return to block S100.

At block S104, in response to recognizing the person that is proximate the access location, the doorbell premises device 20b may transmit to computing environment 14 a recognized person message (e.g., authentication data) indicating the person is a recognized person (Block S106). For example, doorbell premises device 20b may transmit the recognized person message to computing environment 14b via network 15, or to computing environment 14a via control device 22 for use by access control platform 21.

Figure 7:
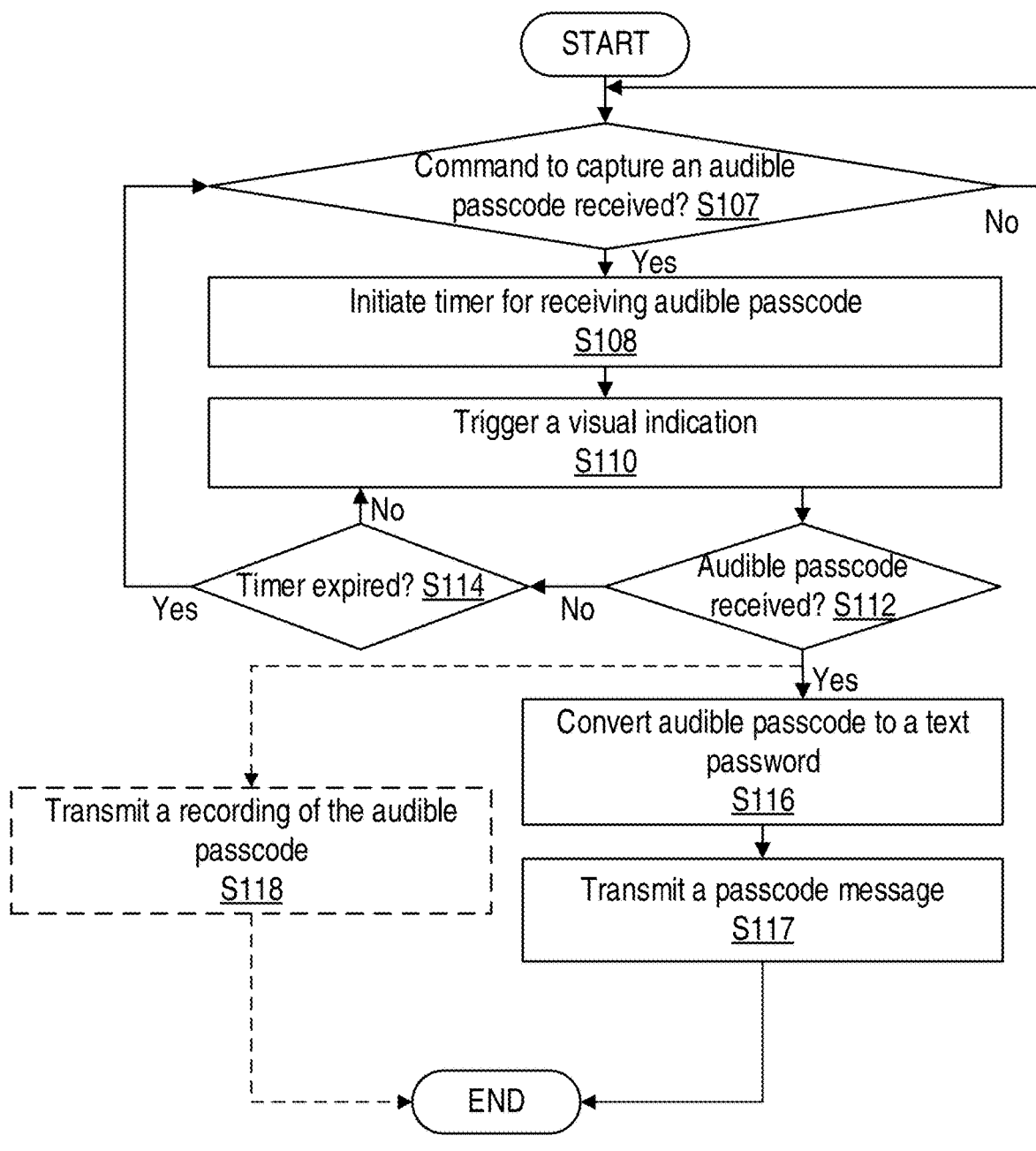
FIG. 7 is a flowchart of example functionality performed by another premises device of FIG. 1 and/or FIG. 2 according to various embodiments of the present disclosure.

FIG. 7 is a flowchart of an example process implemented by door lock premises device 20c according to some embodiments of the present disclosure. Door lock premises device 20c is configured to determine whether a command to capture an audible passcode has been received, as described herein (Block S107). For example, the command may be received from computing environment 14 via control device 22. If a command to capture an audible passcode has not been received, the process may return to block S107. If the command has been received, door lock premises device 20c is configured to initiate a timer (e.g., capture timer) to receive an audible passcode (Block S108). Door lock premises device 20c is further configured to trigger a visual indication, via indicator 58, to prompt the person to provide an audible passcode (Block S110). In alternative embodiments, the door lock premises device 20c may trigger a different type of indication to prompt the person to provide an audible passcode. For example, the door lock premises device 20c may trigger a sound via speaker 57, such as a chime or a recording that states, "Please speak your passcode." Further, in some embodiments, the command to capture an audible passcode may cause the microphone 56 to activate or turn on.

Door lock premises device 20c determines whether an audible passcode has been received or captured by microphone 56 (Block S112). If an audible passcode was not received, door lock premises device 20c is configured to determine whether the timer has expired (Block S114). If door lock premises device 20c determines the timer has expired, the process may return to block S107. If door lock premise device 20c determines the timer has not expired or is still active, the process returns to block S110.

Referring back to block S112, if an audible passcode has been received, door lock premises device 20c is configured to convert the audible passcode to a text password (Block S116). Door lock premises device 20c is further configured to transmit a passcode message (e.g., a passcode indication) to computing environment 14 and/or access control platform 21 (Block S117). In one or more embodiments, the passcode message includes the text passcode. In one or more embodiments, the passcode message may correspond to an authentication indication that is usable by access control platform 21 in the authentication process to determine whether to authenticate the recognized person. Alternatively, at block S118, the door lock premises device 20c may transmit a recording of the audible passcode to control device 22 and/or access control platform 21, and the control device 22 and/or access control platform 21 can convert the recording to text.

Figure 8:
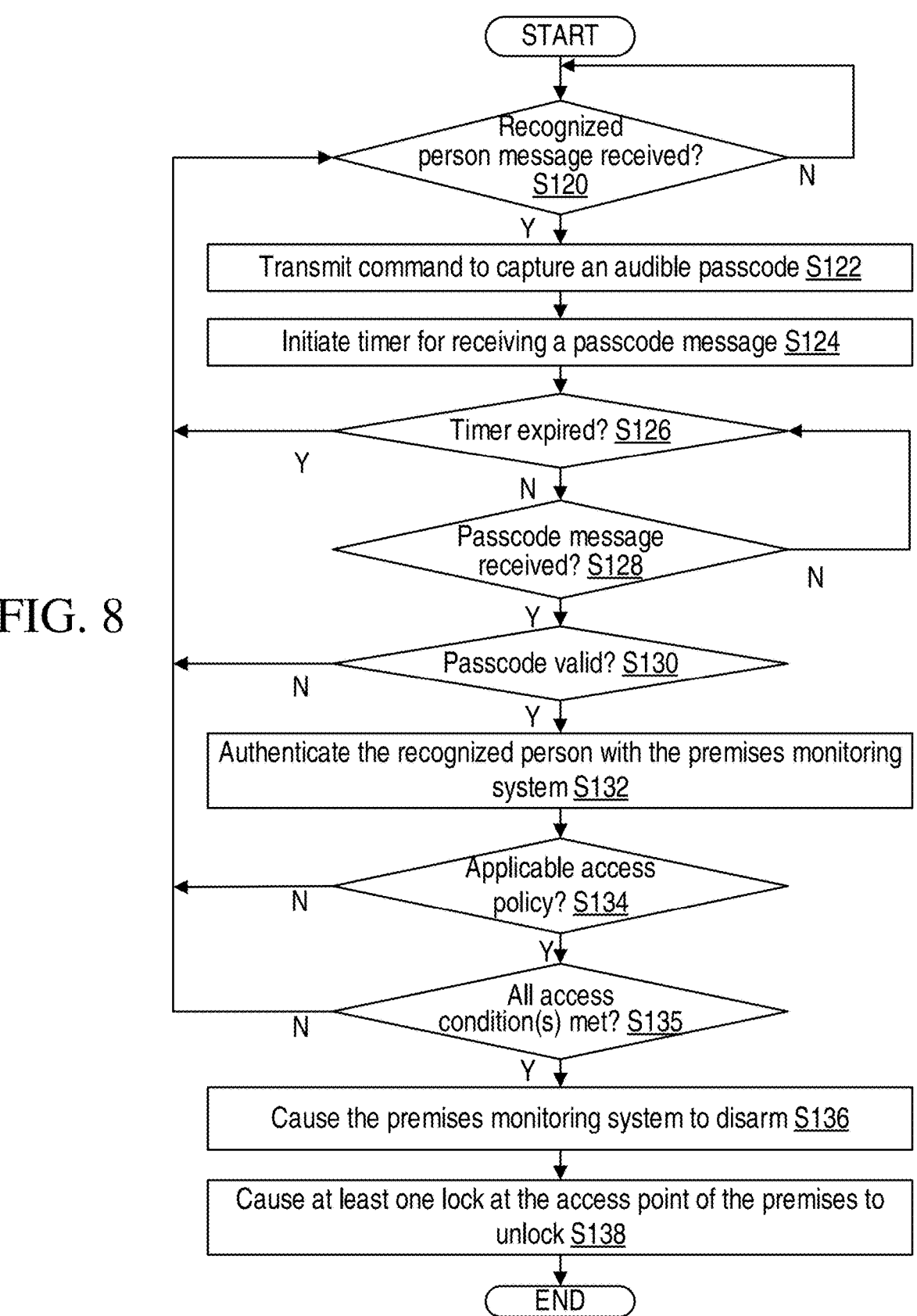
FIG. 8 is a flowchart of example functionality performed by access control platform of FIG. 1 and/or FIG. 2 according to various embodiments of the present disclosure.

FIG. 8 is a flowchart of an example process implemented by access control platform 21 of computing environment 14 according to some embodiments of the present disclosure. For example, access control platform 21 is configured to determine whether a recognized person message has been received (Block S120). If a recognized person message is not received, the process may return to Block S120. If a recognized person message is received, access control platform 21 is further configured to transmit a command for door lock premises device 20c to capture or attempt to capture an audible passcode (Block S122). Access control platform 21 is further configured to initiate a timer for receiving a passcode message (Block S124).

Access control platform 21 is further configured to determine whether the timer has expired (Block S126). If access control platform 21 determines that the timer has expired, the process may return to Block S120. According to one or more embodiments, block S126 may be skipped immediately after the timer is initiated in block S124. If access control platform 21 determines the timer has not expired or is still active, access control platform is further configured to determine whether a passcode message has been received (Block S128). If access control platform determines a passcode message has not been received, the process may return to block S126. If access control platform 21 determines a passcode message has been received while the timer is active or not expired, access control platform 21 is further configured to determine whether the passcode in the passcode message is valid for the recognized user (Block S130). For example, access control platform 21 may compare the passcode in the passcode message to one or more predefined passcodes in data store 19 to determine whether the passcode is valid for the recognized person.

If the passcode is not valid for the recognized person, the process may return to block S120. Alternatively, the process may return to block S126 to give the recognized one or more opportunities to provide a valid audible passcode while the timer is active. If the passcode is valid, access control platform 21 is further configured to authenticate the recognized person with the premises monitoring system 12 (Block S132).

Access control platform 21 is further configured to determine whether there is an applicable access policy for the recognized person (Block S134). For example, access control platform 21 may be configured to determine whether the recognized person is associated with an access policy for premises 13, where the access policy indicates a type of access (e.g., event-based access, time-based access, etc.) allowed for the recognized person that has been authenticated. If there is no applicable access policy for the recognized person, the recognized person may be denied access to premises 13 and the process may return to block 120. If access control platform 21 determines the recognized person is associated with an access policy, access control platform is configured to determine whether all access conditions associated with the recognized person have been met (Block S135). If all access conditions have not been met, the process may repeat the determination of block S135 or end the process.

If access control platform 21 determines that all access conditions have been met, access control platform 21 is further configured to cause the premise monitoring system 12 to disarm (Block S136) and to cause at least one lock at the access point of premises 13 to unlock (Block S138). Alternatively or in addition to the actions of blocks S136 and/or S138, access control platform 21 and/or computing environment 14 may cause premises monitoring system 12 to perform one or more other actions based on the access policy.

Figure 9:
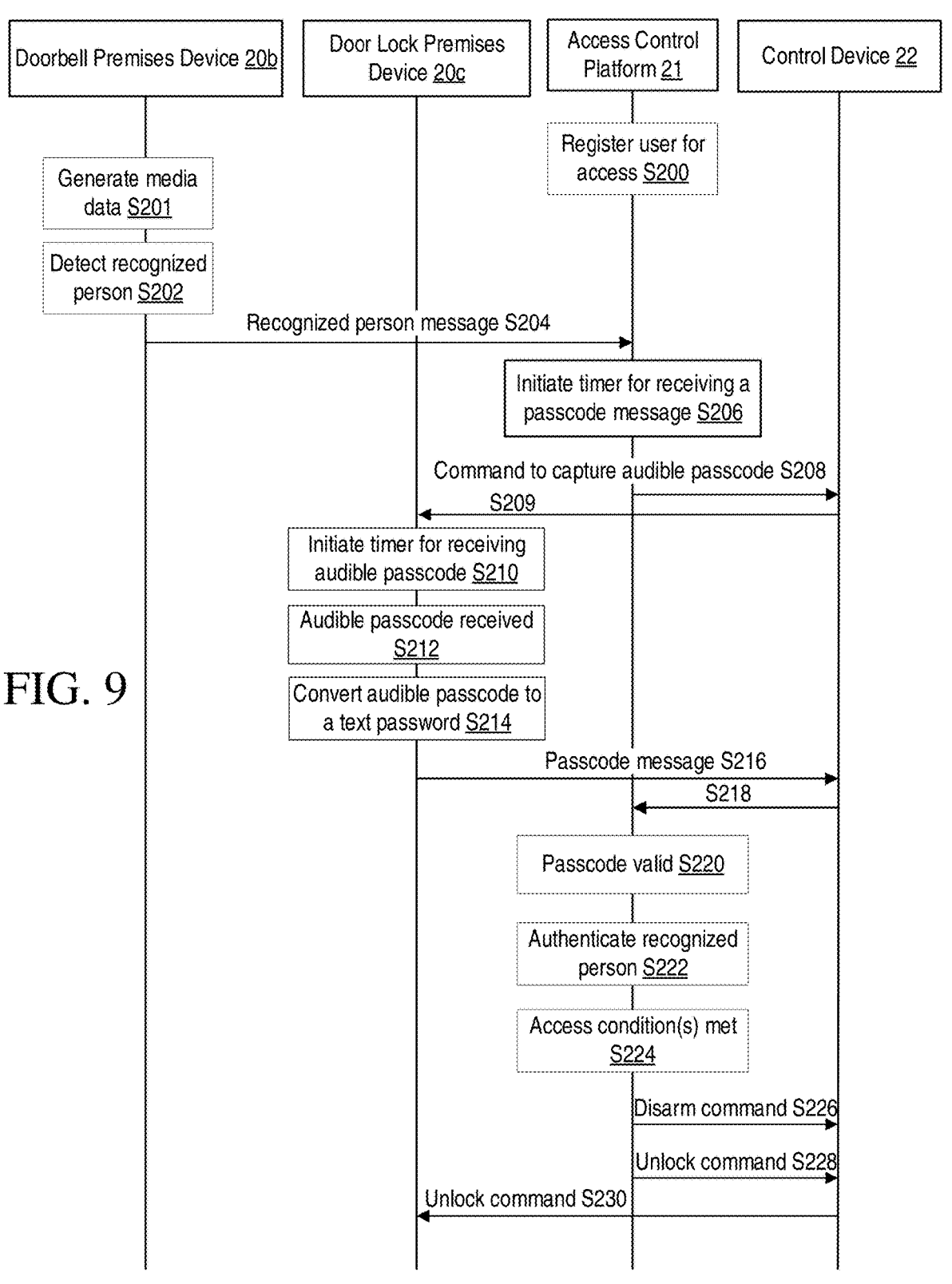
FIG. 9 is a sequence diagram of example functionality performed by various components of FIG. 1 and/or FIG. 2 according to various embodiments of the present disclosure.

FIG. 9 is a sequence diagram of an example process according to various embodiments of the present disclosure. Access control platform 21 is configured to register a user for access to premises 13 (Step S200). For example, during registration, the user may be associated with one or more specific access policies and/or access conditions. Further, registration of the user may comprise receiving an image or video of the recognized person's face for storage in a "face library" accessible by doorbell premises device 20*b* such that doorbell premises device 20*b* can detect a recognized person in media data captured or generated by doorbell premises device 20*b*. Further, registration of the user may comprise verifying the effectiveness of an audible passcode for the user before it is set. For example, access control platform 21 may verify the effectiveness of performing speech-to-text for a particular passcode by testing the speech-to-text using the passcode. If a confidence score of the testing results in a low score (e.g., a score below a threshold), access control platform 21 may provide this feedback to the user, such as by providing visual feedback of the strength and/or quality of the passcode. The user may select or try to set another passcode in response to the feedback. Further, to increase the speech-to-text success rate, access control platform 21 can automatically add closely sounding words to a passcode database of acceptable passcodes when performing speech recognition. For example, someone from one part of the country may pronounce "pants" as "paints" or "tires" as "tars" such that adding these additional words to the passcode database of acceptable passcodes may help increase the success rate of speech-to-text while maintaining security. Further, spoken words or sounds that are not recognized by access control database 21 as being in the English dictionary may likewise be added to the passcode database Doorbell premises device 20*b* is configured to generate media data, as described herein (Step S201). For example, a person approaches a front door of premises 13 and is captured in the field of view of doorbell premises device 20*b*. Doorbell premises device 20*b* is configured to detect a recognized person in the media data generated by doorbell premises device 20*b*, as described herein (Step S202). Doorbell premises device 20*b* is configured to transmit a recognized person message to access control platform 21, as described herein (Step S204). For example, the recognized person message may be transmitted to computing environment 14*b*, where computing environment 14*b* transmits the recognized person message to access control platform 21 of computing environment 14*a*. In another example, the recognized person message is transmitted to access control platform 21 from doorbell premises device 20*b*. In one or more embodiments, the recognized person message is one factor of authentication that is used by access control platform 21 to determine whether to authenticate the recognized person.

Access control platform 21 is configured to, in response to receiving the recognized person message, initiate a timer for receiving a passcode message, as described herein (Step S206). Access control platform 21 is further configured to transmit a command for door lock premises device 20*c* to capture or attempt to capture an audible passcode (Step S208). The control device 22 may receive the command and transmit the command to door lock premises device 20*c* (Step S209). For example, the command may cause door lock premises device 20*c* to monitor for audio and/or an audible passcode. In response to receiving the command to capture an audible passcode, door lock premises device 20*c* is configured to initiate a timer (e.g., capture time) for receiving an audible passcode (Step S210). Door lock premises device 20*c* may monitor for audio proximate door lock premises device 20*c*. In this example, door lock premises device 20*c* receives an audible passcode (Step S212). Door lock premises device 20*c* is further configured to convert the audible passcode to a text passcode (Step S214). Door lock premises device 20*c* is further configured to transmit a passcode message to control device 22 (Step S216). Control device 22 is configured to transmit the passcode message to access control platform 21 (Step S218).

Access control platform 21 is further configured to determine whether the passcode is valid, as described herein. In this example, access control platform 21 determines the passcode is valid (Step S220). Access control platform 21 is further configured to authenticate the recognized person based on the recognized person message and the passcode being valid, as described herein (Step S222). In this example, the authentication criteria for authenticating a person may require receiving two authentication indications within a predefined time period defined by the timer and for the passcode to be valid. Access control platform 21 is further configured to determine whether one or more access conditions associated with the recognized person is met, as described herein. For example, one or more pre-configured rules may be stored in data store 19 and specify the type(s) of authentication acceptable for a particular user and how many authentication factors are required for the access control platform 21 to grant the person access to premises 13. That is, user A may be required to satisfy a first plurality of access conditions in order to gain access to premises 13 while user B may be required to satisfy a second plurality of conditions to be granted access to premises 13 where the first plurality of access conditions is different from the second plurality of access conditions. For example, the first plurality of access conditions may differ from the second plurality of access conditions based on the number of access conditions and/or type of access conditions.

If access control platform 21 determines the access condition is met (Step S224), access control platform 21 is configured to transmit a command, to control device 22, for premises monitoring system 12 to disarm (Step S226). Access control platform 21 is further configured to transmit a command, to control device 22, for premises monitoring system 12 to unlock a door at an access location of the premises 13 (Step S228). Control device 22 is further configured to, in response to the unlock command received from computing environment 14, transmit an unlock command to door lock premises device 20*c* to cause door lock premises device 20*c* to unlock electronic lock 54 (Step S230).

Further, in various embodiments, access control platform 21 may be configured to determine that the person has left the premises 13. For example, an authenticated person has accessed the premises 13, after step S230 is performed, and access control platform 21 may determine that the person has left the premises 13 based on, for example, at least one of signaling, data or indications received from premises monitoring system 12. In response to determining that the person has left the premises 13, access control platform 21 may cause the lock (e.g., door lock premises device 20*c*) to transition from the unlocked state to the locked state and cause the premises monitoring system 12 to transition from the disarmed state to the armed state.

Further, access control platform 21 and/or premises monitoring system 12 may maintain a timestamped log entry for each time an entry is made to premises 13 using one of the types of access as described herein. The log can be reviewed periodically, and permissions (e.g., types of access) can be dynamically modified.

While one or more embodiments described herein relate to a single person being provided access, access control platform 21 may be configured to provide group-based alarm notification and premises access. In group-based notification and access, a predefined group of people is registered with access control platform 21 for respective types of access and/or for receiving emergency and/or non-emergency alerts from premises monitoring system 12. For example, a water leak may be detected by premises monitoring system 12 when the homeowner is out of town. In response to detecting the water leak, premises monitoring system 12 notifies one or more designated people in a group and provides time-based access to one or more members in the group for someone to shut off the water to premises 13.

In a burglar alarm example, group-based notification and access comprises sending an alarm signal and pertinent information to all of the designated users in the group. The community of users in the group can review the information, access video of people detected in premises 13 prior to and/or during the alarm, and confirm whether the alarm is a true alarm event requiring first responders or if it is a false alarm. In this example, the group may be provided with alarm-based access, as described herein.

In an independent living scenario, community monitoring may involve family, caregivers, neighbors, and service providers for which access to premises 13 is provided based on predefined schedules and predefined rules. For example, in-home grocery delivery providers can enter the home at scheduled times to deliver fresh food according to time-based access rules where authentication of a delivery person may occur as described herein. Family and caregivers can view a summary of daily activity (e.g., logs) that is maintained at computing environment 14. Further, first responders can gain access to premises 13 in the event of a fall or other emergency according to, for example, event-based access.

The concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspect. Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions and/or acts specified in the flowchart and/or block diagram block or blocks.

The functions and acts noted in the blocks may occur out of the order noted in the operational illustrations. For example, two blocks shown in succession may in fact be executed substantially concurrently or the blocks may sometimes be executed in the reverse order, depending upon the functionality and/or acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In addition, unless mention was made above to the contrary, the accompanying drawings are not to scale. A variety of modifications and variations are possible in light of the above teachings without departing from the scope and spirit of the present disclosure.

What is claimed is:

1. A system, comprising:

a video doorbell camera proximate an access location of a premises, the video doorbell camera configured to:
   generate video data;
   detect a recognized person in the video data using facial recognition analytics, the recognized person being associated with the premises; and
   transmit a video-based recognized person message indicating the recognized person associated with the premises is proximate the access location of the premises;

at least one computing device comprising:

at least one processor; and at least one memory storing computing instructions that, when executed by the at least one processor, cause the at least one computing device to:
   receive the video-based recognized person message indicating the recognized person associated with the premises is proximate the access location of the premises, the video-based recognized person message being associated with video-based authentication at the video doorbell camera, the video-based recognized person message corresponding to a first authentication indication for authenticating the recognized person; and
   in response to receiving the video-based recognized person message:
      cause transmission, to an electronic door lock that is part of a premises monitoring system, of a command for the electronic door lock to record an audible passcode; and
      in response to the transmission of the command, initiate a timer for receiving a passcode message;

the electronic door lock is in communication with the computing device, the electronic door lock comprising a microphone and a visual indicator, the electronic door lock configured to:
   receive the command to record the audible passcode;
   trigger a prompt for the recognized person to provide the audible passcode;
   capture the audible passcode;
   convert the audible passcode to a text passcode; and
   cause transmission of a passcode message, the passcode message comprising the text passcode; and the computing instructions are further configured to cause the at least one computing device to:
   receive the passcode message while the timer is active;
   in response to receiving the passcode message while the timer is active, authenticate the recognized person based on the recognized person message and the passcode message;
   in response to authenticating the recognized person, determine the recognized person is allowed access to the premises based on at least one access policy; and
   in response to determining the recognized person is allowed access to the premises,
      cause the premises monitoring system to disarm; and
      cause the electronic door lock to unlock.

2. A system, comprising:

at least one computing device:

at least one processor; and at least one memory storing computing instructions that, when executed by the at least one processor, cause the at least one computing device to:
   receive a video-based recognized person message indicating a recognized person associated with a premises is proximate an access location of the premises, the video-based recognized person message being associated with video-based authentication at a first premises device, the video-based recognized person message corresponding to a first authentication indication for authenticating the recognized person; and
   in response to receiving the video-based recognized person message, cause transmission, to a second premises device that is part of a premises monitoring system, of a command for the second premises device to capture an audible passcode from the recognized person;
   receive a passcode message based on the audible passcode;
   authenticate the recognized person based on the recognized person message and the passcode message; and
   in response to authenticating the recognized person:
      cause the premises monitoring system to disarm; and
      cause an electronic door lock associated with the premises to unlock.

3. The system of claim 2, wherein the electronic door lock configured to convert the audible passcode to a text passcode, the passcode message comprising the audible passcode.

4. The system of claim 2, wherein the electronic door lock further comprises a visual indicator, the electronic door lock is further configured to:
   receiving a command to monitor for an audible passcode; and
   trigger a visual indication from the visual indicator, the visual indication indicating for the recognized person to provide the audible passcode.

5. The system of claim 4, wherein the electronic door lock is further configured to: initiate a capture timer during which to capture the audible passcode; and
   in response to the capture timer expiring, cease monitoring for the audible passcode and cease the visual indication.

6. The system of claim 2, wherein the instructions are further configured to cause the at least one processor of the computing device to, in response to receiving the recognized person message, initiate a timer for receiving the passcode message.

7. The system of claim 6, wherein the authentication of the recognized person is further in response to receiving the passcode message before the timer expires.

8. The system of claim 7, wherein the instructions are further configured to cause the at least one processor of the at least one computing device to, in response to not receiving the passcode message before the timer expires, not authenticate the recognized person with the premises monitoring system.

9. The system of claim 2, wherein the first premises device is a video doorbell camera that is proximate the access location of the premises, the video doorbell camera configured to:
   generate media data;
   detect the recognized person in the media data using facial recognition analytics, the recognized person being associated with the premises; and transmit the recognized person message to at least one other computing device.

10. The system of claim 9, wherein the video doorbell camera is a third-party device that is not configured to communicate with the premises monitoring system.

11. The system of claim 2, wherein the instructions are further configured to cause the at least one processor of the at least one computing device to, in response to authenticating the recognized person, determine the recognized person is allowed access to the premises based on at least one access policy; and the causing of the premises monitoring system to disarm and the electronic door lock to unlock being in response to determining the recognized person is allowed access to the premises.

12. A method implemented by a system, the system comprising a at least one computing device, the method comprising:

receiving a video-based recognized person message indicating a recognized person associated with a premises is proximate an access location of the premises, the video-based recognized person message being associated with video-based authentication at a first premises device, the video-based recognized person message corresponding to a first authentication indication for authenticating the recognized person;

in response to receiving the video-based recognized person message, causing transmission, to a second premises device that is part of a premises monitoring system, of a command for the second premises device to capture an audible passcode from the recognized person;

receiving a passcode message based on the audible passcode;

authenticate the recognized person based on the recognized person message and the passcode message; and in response to authenticating the recognized person:

causing the premises monitoring system to disarm; and causing an electronic door lock associated with the premises to unlock.

13. The method of claim 12, further comprising converting, by the electronic door lock, the audible passcode to a text passcode, the passcode message comprising the audible passcode.

14. The method of claim 12, wherein the electronic door lock further comprises a visual indicator; and the method further comprising:

receiving a command to monitor for an audible passcode; and triggering a visual indication from the visual indicator, the visual indication indicating for the recognized person to provide the audible passcode.

15. The method of claim 14, further comprising:

initiate, by the electronic door lock, a capture timer during which to capture the audible passcode; and in response to the capture timer expiring, cease monitoring for the audible passcode and cease the visual indication.

16. The method of claim 12, further comprising, in response to receiving the recognized person message, initiate a timer for receiving the passcode message.

17. The method of claim 16, wherein the authentication of the recognized person is further in response to receiving the passcode message before the timer expires.

18. The method of claim 12, wherein the first premises device is a video doorbell camera that is proximate the access location of the premises; and the method further comprising:

generate, by the video doorbell camera, media data;

detect the recognized person in the media data using facial recognition analytics, the recognized person being associated with the premises; and transmit the recognized person message to at least one other computing device.

19. The method of claim 18, wherein the video doorbell camera is a third-party device that is not configured to communicate with the premises monitoring system.

20. The method of claim 12, further comprising, in response to authenticating the recognized person, determine the recognized person is allowed access to the premises based on at least one access policy; and the causing of the premises monitoring system to disarm and the electronic door lock to unlock being in response to determining the recognized person is allowed access to the premises.

* * * * *